Figure 1:
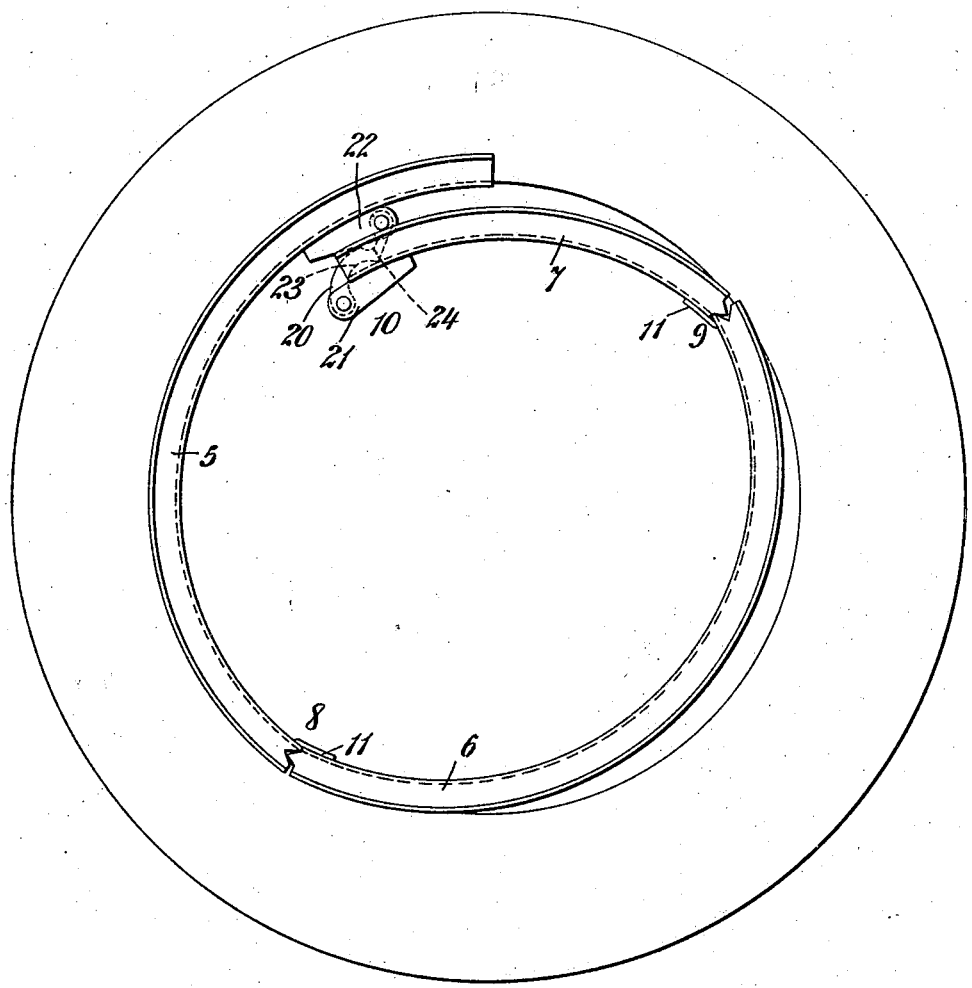

Oct. 29, 1929.   P. M. MILLER   1,733,972
DEMOUNTABLE RIM JOINT
Filed March 17, 1928   2 Sheets-Sheet 1

INVENTOR
PHILIP M. MILLER
BY
ATTORNEY

Oct. 29, 1929.   P. M. MILLER   1,733,972
DEMOUNTABLE RIM JOINT
Filed March 17, 1928   2 Sheets-Sheet 2
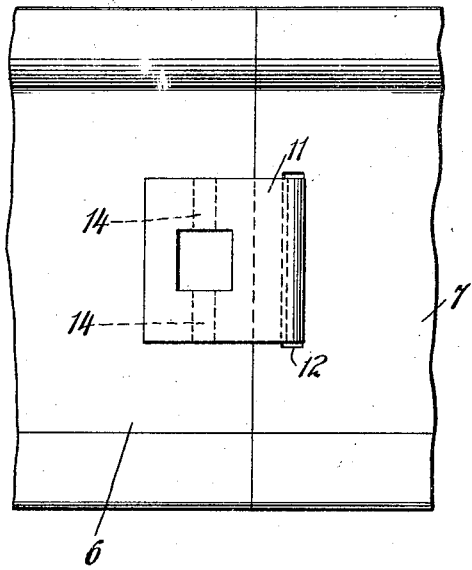
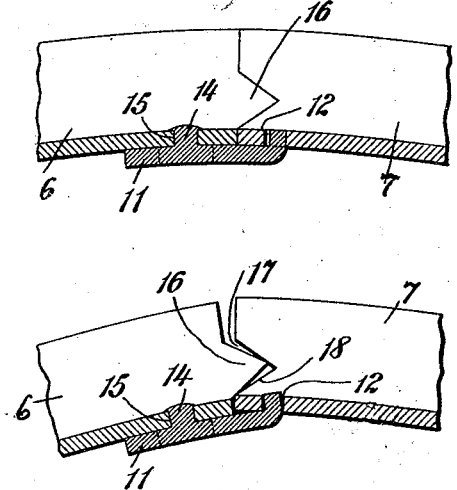
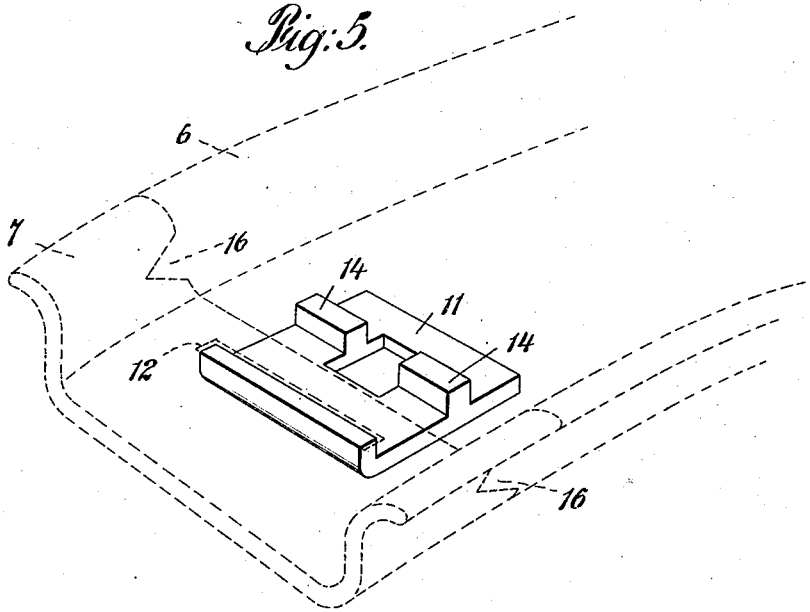
INVENTOR
PHILIP M. MILLER
BY
ATTORNEY Patented Oct. 29, 1929

1,733,972

UNITED STATES PATENT OFFICE

PHILIP M. MILLER, OF BROOKLYN, NEW YORK, ASSIGNOR TO R. E. H. INCORPORATED, A CORPORATION OF NEW YORK

DEMOUNTABLE-RIM JOINT

Application filed March 17, 1928. Serial No. 262,439.

The present invention relates to automobile wheels and has for an object to provide an improved demountable rim and especially an improved joint for such rim.

The invention provides a simple and effective joint for sectional rims of a type which can be expeditiously and economically manufactured and which can be readily connected and disconnected as occasion may require. It provides also an effective hinge joint such that the limited movement required is permitted while retaining the sections effectively connected.

The nature and objects of the invention will be better understood from a description of a particular illustrative embodiment thereof for the purpose of which description reference should be had to the accompanying drawings forming a part hereof and in which—

Figure 1 is a side view of a sectional rim embodying the invention shown in contracted condition within a tire, Figure 2 is a plan view showing the detail of the joint between the rim sections, Figure 3 is a sectional detail view of the same, Figure 4 is a view similar to Fig. 3 showing the joint flexed, and Figure 5 is a detail perspective view of said joint.

The rim shown for the purposes of illustrating the invention comprises three channel-shaped rim sections 5, 6, 7 connected by two hinge joints 8, 9 and a third joint 10 arranged to lock the sections circumferentially in relation with a tire and to permit movement of the sections from alined, abutting position to overlapped position in which the rim is contracted for removal from the tire.

The present invention relates more specifically to the construction of the hinge joints connecting the sections 5, 6 and 7. These joints are similar. The joint indicated at 8 will be described. It comprises a member 11 of substantially uniform cross-section secured to the section 6 and bent at its free end to form a right angled hook engaging a slot 12 in the section 5. The hook member practically fills the slot 12 with just enough clearance to permit necessary movement and terminates at its free end flush with the inner face of the slotted section to provide a substantially smooth tire engaging rim face. It is formed preferably with integral projections 14 engageable in rectangular apertures 15 and riveted to provide a rigid connection to the rim section 6.

The hook is maintained in the slot to prevent relative movement of the section radially by interengaging V-shaped projections and recesses 16, 17 formed in the side flanges of abutting ends of the rim sections. The taper and length of the projections 16 and the position of the inner edges 18 thereof relative to the effective pivot of the hinge is such that during the first part of the angular movement of the rim sections relative radial movement is substantially prevented thereby. Upon further movement the projections 16 are entirely withdrawn from the recesses 17, the projections sliding upon the inner edges of the recesses, and the hook of member 11 moves in through slot 12 towards the beads of the tire to a position in which it alone holds the sections together. Ordinarily the requirements of accuracy are not such as to make it necessary to curve the inner faces of the projections 16. When the edges are straight, as shown, they sufficiently approximate the shape of an arc having its centre at the effective pivotal point to serve all practical requirements.

The joint 10 between the abutting sections 5 and 7 comprises a link 20 pivoted at one end between two lugs or ears 21 which are secured to and extend beyond the end of the section 7 and pivoted at the other end between ears 22, secured to the rim section 5 at a distance from the end thereof.

The link is recessed at one side as indicated at 23 for two purposes. When the rim is contracted and the ends overlapped, this recess fits over the end of the rim section 7 permitting greater relative contracting movement of the rim sections. When the rim is in expanded condition with the tire thereon, this recess permits the insertion of a tool between the link and the body of the rim for the prying operation by which the rim is contracted.

The link is also recessed at the inner side as indicated at 24 for the purpose of connecting with driving means of a wheel. The engagement with such driving means functions to lock the rim in expanded condition while in use.

When the rim is removed from the wheel, the tension of the tire cooperates with the link 20 to lock the rim in position with the rim sections accurately abutting.

It is to be noted that during the first part of the contacting movement of the rim, the rim section 7 and the link 20 coact after the manner of a toggle to expand the rim within the tire and thus to break loose the tire from the rim in the case of adherence due to corrosion or the like. This will be clear from consideration of the movement of the pivot points from the positions in which they lie when the rim is expanded to the position in which they will lie in a straight line. Since the tire is expanded or stretched during this first movement it acts after the manner of a spring tending to forcibly contract the rim after the dead centre position in which the three pivots lie in a straight line is passed. This action further assists in breaking the adhesion between the tire and rim.

It will be clear that when the rim is in the expanded condition, the rim sections at each of the joints 8 and 9 are held rigidly in position and firmly secured against any distortion by the interengaging projections and recesses 16, 17 cooperating with the hook members 11. The link, because of its flush alinement with the arc of the sections, holds the abutting ends of the sections 5 and 7 locked, and therefore all the sections are held rigidly in position.

When the abutting ends of the sections 5 and 7 are moved to overlapping relation, the relatively slight angular movement of the rim sections at the joints 8 and 9 will be accommodated by a movement involving the partial withdrawal of the V-shaped projections from the V-shaped recesses but the lower faces of the projections will still sufficiently engage the lower faces of the recesses to prevent the radial movement necessary to disconnect the hook 11 from the slot 12 to separate the sections.

The operation of contracting the rim involves a preliminary expansion thereof which distorts the tire, as above noted. This involves a slight outward flexing of the joint 9 which precedes the inward flexing of the same. The clearances in the joint are sufficient to make possible this reverse hinge movement.

The foregoing particular description is illustrative merely and is not intended as defining the limits of the invention.

This application is a continuation in part of applicant's co-pending application Serial Number 743,462, filed October 13, 1924.

I claim:

A sectional rim comprising abutting channel-shaped rim sections, one section having at its end a transverse slot in the base thereof, the other section having an L-shaped hook member of substantially uniform cross-section engaging said slot and terminating flush with the inner face of the rim section, the abutting side walls of said sections having interengaging V-shaped projections and recesses arranged to prevent relative radial movement when said sections are in substantially alined relation, and arranged to have sliding engagement to prevent disengagement of said hook and slot when said sections are moved angularly, substantially as described.

In testimony whereof, I have signed my name to this specification this 14th day of March, 1928.

PHILIP M. MILLER.